Dec. 26, 1922.
W. T. DONNELLY.
TENSION PLANK SPLICE.
FILED AUG. 31, 1918.
1,440,064
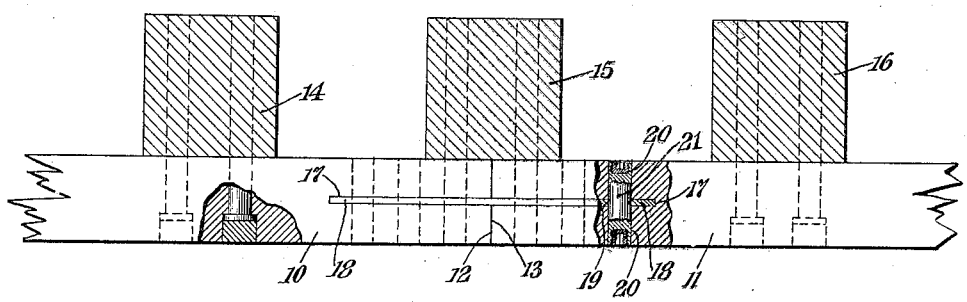
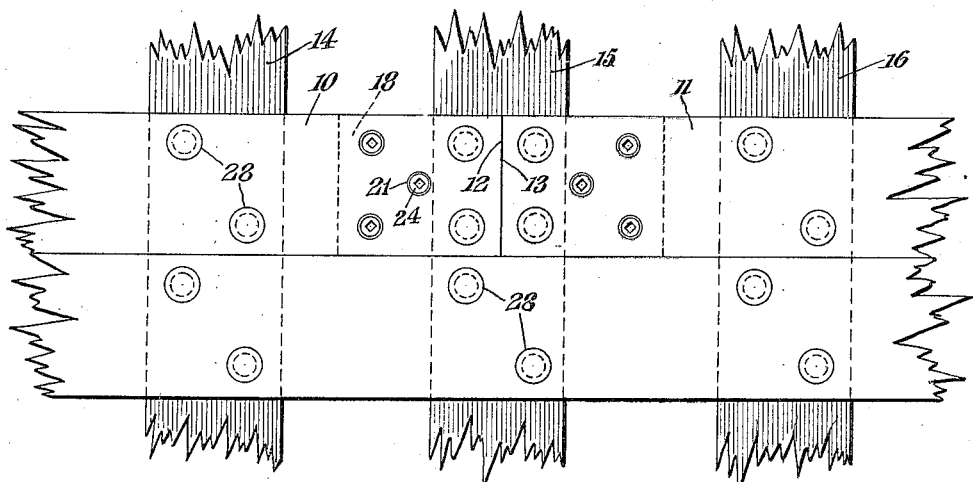
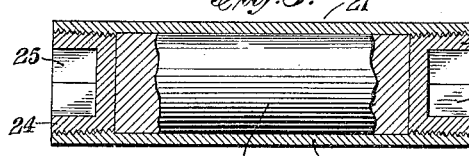 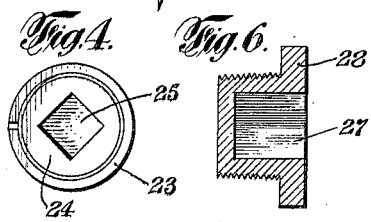 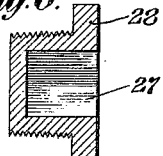
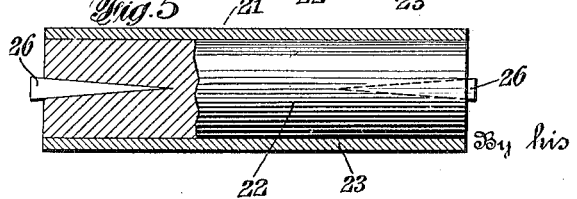
Inventor
William T. Donnelly
By his Attorney
Bedk T. Schuetz Patented Dec. 26, 1922.

1,440,064

UNITED STATES PATENT OFFICE.

WILLIAM T. DONNELLY, OF BROOKLYN, NEW YORK.

TENSION PLANK SPLICE.

Application filed August 31, 1918. Serial No. 252,146.

*To all whom it may concern:*

Be it known that I, WILLIAM T. DONNELLY, a citizen of the United States, and a resident of Brooklyn, in the county of Kings and State of New York, have invented certain new and useful Improvements in Tension Plank Splices, of which the following is a specification.

The invention relates to an improved splice for ship planks, and to a novel fastener member or treenail for use in connection therewith. It has for its object to positively secure the abutting ends of the two planks without appreciably decreasing the tensile strength thereof, while at the same time affording a substantially continuous plank, for example, such as employed along the sides of a ship. A further object of the invention is to provide an improved form of treenail which is particularly adapted for use in connection with the novel form of splice set forth as well as for securing the planking to frame timbers.

The nature of the invention will be best understood when described in connection with the accompanying drawings, in which—

Fig. 1 is a fragmentary view, partly in section, showing the improved manner of uniting the abutting ends of two planks, herein shown, by way of example, as secured to the ribs of a ship.

Fig. 2 is a fragmentary view, showing the united planks in elevation and the attachment of same to the frame timbers.

Figs. 3 and 4 are respectively a longitudinal section and an end view of an improved fastener member, or treenail.

Fig. 5 is a longitudinal section illustrating a modification of the novel treenail.

Fig. 6 is a longitudinal section illustrating a modification of the expansion nut employed in connection with the improved treenail.

Similar characters of reference designate corresponding parts thruout the several views.

Referring to the drawings, 10 and 11 represent the planks to be united and shown with their ends 12 and 13 abutting, the said planks being designed to be secured, in any suitable manner, to members 14, 15 and 16, for example, representing the ribs of a ship's frame as one structure for which the invention is particularly adapted. In this embodiment, it is highly desirable that a proper connection be effected between the abutting ends of the planks to prevent the same from giving way under tension, as well as to afford a tight joint without materially reducing the tensile strength of the planking.

For this purpose, the ends of the said planks are cut inwardly, substantially along the median plane for a predetermined distance, forming suitable recesses 17 in which fits a metal or stop plate 18, in the present instance, being driven in from a side of the planks. This plate is provided with suitable perforations 19, and the respective planks on both sides of the plate with holes 20 registering with the said perforations 19 to receive a suitable fastener member 21. This member is shown more particularly in Figs. 3 and 4, and is preferably in the form of a suitable filling portion, such as a wooden treenail 22 which is surrounded by a tubular metal portion 23, the latter being preferably slit longitudinally for a short distance at each end, as indicated, Fig. 4. The said tube, thru the wooden filler, is secured against collapse and the weight of a metal fastener member thereby reduced. Of course, the filler portion may be omitted; and the treenail 21, moreover, may be provided at each end with internal, inwardly tapering threads to receive expansion plugs 24, which serve also to close the said tube. When the filler portion is employed, the same is then correspondingly cut away to allow of the insertion of said plug. The latter is formed with a suitable wrench socket 26; and as the said plugs are inserted, the ends of the tube are thereby expanded sufficiently to insure a secure hold in the planks. Instead of the screw plugs 24, ordinary wedges 26 may be driven into the wooden filler portion 22, as shown in Fig. 5.

The improved treenail may be employed, also, to secure the planking to the timbers 14, 15 and 16, as indicated in Figs. 1 and 2. In this case, the end fitting within the planking is provided with an expansion plug 27, Fig. 6, having a suitable flange 28 formed thereon to prevent the withdrawal of a plank from its timber.

By the means hereinbefore described, a very secure connection, not only between the planks and timbers is afforded, but also between the ends of the planks themselves, the plate 18 serving not only to form a substantial closure, but also to reenforce the planks. It provides, moreover, for a balanced double shear of the fastener member in its relation to the wood, and a single shear in its relation to the metal plate. Also, the action, thru the employment of a metal bound treenail, is of metal against metal.

I claim:

In ship construction, the combination with the meeting ends of two butt-ended planks provided with alining grooves extending along the central portion thereof, of a continuous plate disposed in said grooves and provided with relatively large apertures disposed on the respective sides of the meeting line of said planks, said planks having corresponding apertures registering with the apertures in said plate, and pins snugly received in said apertures and connecting said planks to said plate.

Signed at New York, in the county of New York and State of New York, this 29th day of August, A. D. 1918.

WILLIAM T. DONNELLY.